United States Patent [19]
Brush, II et al.

[11] Patent Number: 5,732,232
[45] Date of Patent: Mar. 24, 1998

[54] METHOD AND APPARATUS FOR DIRECTING THE EXPRESSION OF EMOTION FOR A GRAPHICAL USER INTERFACE

[75] Inventors: Abbott Purdy Brush, II, Woodbridge, Conn.; David Christopher Dryer, Austin, Tex.; David Bruce Lection; Donald Robert Wood, both of Raleigh, N.C.

[73] Assignee: International Business Machines Corp., Armonk, N.Y.

[21] Appl. No.: 718,078

[22] Filed: Sep. 17, 1996

[51] Int. Cl.⁶ .................................................. G06F 3/00
[52] U.S. Cl. ............................................................ 395/339
[58] Field of Search ................................. 395/339, 140, 395/141, 977

[56] References Cited

U.S. PATENT DOCUMENTS

| | | | |
|---|---|---|---|
| 4,949,286 | 8/1990 | Ohba | 364/521 |
| 5,367,454 | 11/1994 | Kawamoto et al. | 364/419.2 |
| 5,590,062 | 12/1996 | Nagamitsu et al. | 395/326 X |
| 5,630,017 | 5/1997 | Gasper et al. | 395/2.85 |
| 5,649,086 | 7/1997 | Belfer et al. | 395/141 |

OTHER PUBLICATIONS

Shigeo, M.,"Quantilative Representation and Modelling of Emotion Information for Human–machine Interface with face Expression," Hyuman, Intafesu, shinpojium Ronbonshu, 1993, V. 9, pp. 357–360.

Hiroshi, K, "Study on Face Robot for Active Human Interface." Nippon Robotto Gakkaishi, v. 12, n. 1, pp. 155–163, 1994.

Honda, N., "Multiranate Data Representation and Analysis by Face Pattern using Facial Expression characteristics," Pattern Recognition, V. 19, N. 1, 1986, pp. 85–94.

Chernoff, H.,"The Use of Faces to Represent Points ink–dim. Space Graphically." J. of the American statistical Assoc; V. 68,N. 342, 1973 pp. 361–368.

*Primary Examiner*—Raymond J. Bayerl
*Assistant Examiner*—A. Katbab
*Attorney, Agent, or Firm*—Jeanine S. Ray-Yarletts

[57] ABSTRACT

A method and system for controlling the expression of emotion on a graphical representation of a face on a computer system. The system allows the user to indicate the intensity of the emotion to be displayed using a two dimensional plane. Each point on the plane representing a different variation of the direction and intensity of the Control and Affiliation emotions. When the user chooses the point on the plane to represent the emotion, the eyes, eyebrows and mouth of the graphical face are manipulated to represent the indicated emotion.

11 Claims, 4 Drawing Sheets

METHOD AND APPARATUS FOR DIRECTING THE EXPRESSION OF EMOTION FOR A GRAPHICAL USER INTERFACE

FIELD OF INVENTION

The present invention relates generally to the use of graphical user interfaces for the computer; and more specifically to the process of controlling the display of human emotion using facial feature placement on a graphical user interface of a computer.

BACKGROUND OF THE INVENTION

Increases in processor capability and reduction in the cost of display technologies have led to rapid acceptance of computers in our society. One area of explosive growth for computers and technology is the Internet and the world wide web. The Internet (sometimes referred to as the world wide web) is a connection of computers using the TCP/IP protocol which allows a user to access information by indicating the location of the information which they desire to retrieve or by traversing hyper-text links which link different information locations. Many products have been developed which also assist the user in searching the web for desired information. Access to the world wide web can be accomplished very inexpensively using a phone line, an inexpensive computer and web browser software such as Netscape's Navigator or IBM's Web Explorer. This ability to inexpensively connect into the world wide web has encouraged its use for much more than business purposes. The world wide web is used for educational research, shopping, games, making reservations, trading stock and numerous other purposes. Children, as well as adults, are frequent users of the world wide web.

One area of the Internet which is attracting significant interest is the area of Virtual Reality. Virtual Reality (VR) is the term used to identify the simulation of reality using audio and video or visual input. More specifically, as stated in "Playing God" by Bernie Roehl and published by Waite Group Press: "Virtual reality is a computer-generated simulation of a three -dimensional environment, in which the user is able to both view and manipulate the contents of that environment. Using various input devices, users can move through the virtual environment (or cyberspace) in much the same way that they move through the real world; as they travel around, the computer keeps track of their location and orientation and provides a real-time view of the virtual world. Other input devices let users 'reach out and touch' the objects around them, and manipulate them the way they would objects in everyday life."

Virtual Reality traditionally uses computer simulations containing 3D graphics and devices to allow the user to interact with the simulation. Much of what the user can now browse as "data" on the world wide web, the user may be able to 'experience' as 3D web sites that offer three dimensional views. These web sites are constructed with a Virtual Reality Modeling Language, herein referred to as VRML, which allows for the design and implementation of a platform-independent scene descriptions. VRML utilizes http (a Hyper Text Transfer Protocol used on the internet) in its implementation.

VRML allows an individual to construct three dimensional, viewable, representations of objects. These objects can then be placed on a web site, and viewed on the world wide web, by any user that has a VRML enabled browser installed on the user's computer. These objects can be just about any object the VRML author can imagine, such as: objects such as telephones, houses, cityscapes, or three dimensional representations of data, or even animals or human characters.

As computer systems become more and more advanced, the graphical user interfaces have also become more advanced and more complicated. The amount of information capable of being processed by computers is incomprehensible to the average user. Methods need to be developed to more efficiently transfer the information gathered by the computer to the user without inundating the user with raw data. The graphical user interface is a means for accomplishing this goal.

A particularly interesting area of use for the graphical user interfaces is the display of emotion or attitude by way of representing facial expressions. Character models are becoming increasingly popular as an advanced metaphor for communications on the Internet. The positioning of the facial muscles through a graphical user interface allows the transfer of a great deal of information concerning the subject being represented in a very concise and quick manner. The user is not required to read through large amounts of data to understand what the character being represented is "feeling". This can become very beneficial in such contexts as game rooms, chat rooms, or other "social" situations while traversing the Internet.

A number of studies have examined how emotions are expressed. Darwin, for example, theorized that human facial expressions of emotion evolved from animal displays [Darwin, C. (1872/1965). The expression of emotion in man and animals. Chicago: University of Chicago Press].Later, Ekman and his colleagues studied the specific facial muscles, especially those controlling the eyes, eyebrows and mouth, that are used to communicate socially the fundamental emotions [Ekman, P., and Friesen, W. V. (1971). Unmasking the face. Prentice-Hall: Englewood Cliffs, N.J.].

Recent work has tied research on the expression of emotion to theories that describe the relationship between two people in an interaction. The interpersonal circumplex represents a dominant model for the interpersonal domain of personality. This model was pioneered in the late 1940's by the Kaiser Foundation Research Group with champions such as Marvin Freedman, Rolfe LaForge and Timothy Leary [e.g., Leary, T. F. (1957). Interpersonal diagnosis of personality. New York. Ronald Press.]

Follow-up work in this area includes: Conte, H. R., & Plutchik, R. (1981) A circumplex model for interpersonal personality traits. Journal of Personality and Social Psychology, 40, 701–711; Kiesler, D. J. (1983) The 1982 interpersonal circle: A taxonomy for complementarity in human interactions. Psychological Review, 90, 185–214; Strong, S. R., Hills, H., Kilmartin, C., DeVries, H., Lanier, K., Nelson, B., Strickland, D., & Meyer, C. (1988). The dynamic relations among interpersonal behaviors: A test of complementarity and anticomplementarity. Journal of Personality and Social Psychology, 54, 798–810; and, Wiggins, J. S., & Broughton, R. (1985) The interpersonal circle: A structural model for the integration of personality research. Perspective in Personality, 1, 1–47.

Kiesler's 16 element circumplex model is shown in FIG. 1. It embodies two fundamental assumptions:

(1) interpersonal traits vary along a circular continuum; traits closer on the continuum are hypothesized to be more similar than are those further apart on the continuum;

(2) interpersonal traits are, in part, an expression of two basic dimensions of interpersonal relation (a) Dominance or Control (versus submissiveness) and (b) Love or Affiliation (versus hostility).

The vertical axis of Kiesler's circumplex represents the dimension of control and the horizontal axis represents the dimension of affiliation (although this could easily be modified as would be obvious to one skilled in the art). These two basic dimensions of interpersonal relation also describe the attitude and emotion of social partners and the expression of these qualities [Dryer, D. C. (1993). Interpersonal goals and satisfaction with interactions. Doctoral dissertation, Stanford University; Knutson, B. D. (1993). A new view of character: Links between facial expression and disposition. Doctoral dissertation, Stanford University].

OBJECTS OF THE INVENTION

It is an object of the present invention to provide a display mechanism for showing human emotion on a computer generated likeness of a face.

It is yet another object of the present invention to allow this emotion to be displayed as a range of a two-dimensional continuum.

It is yet another object of the present invention to represent the emotions onto the computer generation of a human face using the manipulation and positioning of the eyes, eye brows, and mouth.

It is yet another object of the present invention to allow the user to select an emotion and its intensity by clicking the computer's pointing device with a mouse button or a selector on any point within a two dimensional graph representing the emotions of the circumplex theory. The selection of the point being translated into the appropriate value for the dimension of the emotion, in proportion to the point's position in the graph for each axis, and the face being updated to reflect the new emotional state.

SUMMARY OF THE INVENTION

The graphical user interface of a computer workstation can be used to display a likeness of a face on a display device or monitor. By positioning the features of the face in various ways, the face can be used to represent and display human emotions. Incorporating the teachings of the circumplex theory into the graphical user interface of a computer, a system and method are created which allow the manipulation of the likeness of a human face such that the eye brows and eyes reflect the Control dimension of the circumplex theory and the mouth represents the Affiliation aspects of the circumplex theory.

DETAILED DESCRIPTION OF THE PREFERRED EMBODIMENT

The present invention describes a graphical metaphor, referred to as an emotion control for purposes of this disclosure, that allows alteration and display of human emotions by way of a face in a two dimensional arena. The control is based on the circumplex theory of interpersonal relationships. The dimensions utilized by the present invention are the expression of the Control dimension by way of representing positioning of the eyes and eye brows and the expression of the Affiliation dimension by way of representing positioning of the mouth.

For example if the human mouth is displayed in a smile configuration a positive emotion is expressed. If a frown is displayed a negative emotion is expressed. Simultaneously, the degree of aggression can be expressed by the eyes and the eyebrows. The further the eyebrows get from the eyes, the more passive the expressed emotion.

In the emerging market of VRML, as well as in non-VRML environments, character models are becoming increasingly popular as an advanced metaphor for communications on the Internet and the world wide web. Traditionally the communication of these characters has been limited to 'text only' user interfaces. As these characters communicate with text in chat rooms, game rooms, and other social contexts, the present invention allows emotions can be graphically displayed by the characters to add depth to the communications experience.

Existing art in this area, such as the Microsoft Comic Chat emotion control allow for display of specific emotions: happiness, sadness, surprise. The present invention improves the art by giving the computer user a means to specify emotion in (1) much finer gradations, and (2) a range of intensity. The user, by placing the emotion index point anywhere in the plane of the emotion control, can produce many more faces with much finer detail in the display of the emotion.

Figure 1:
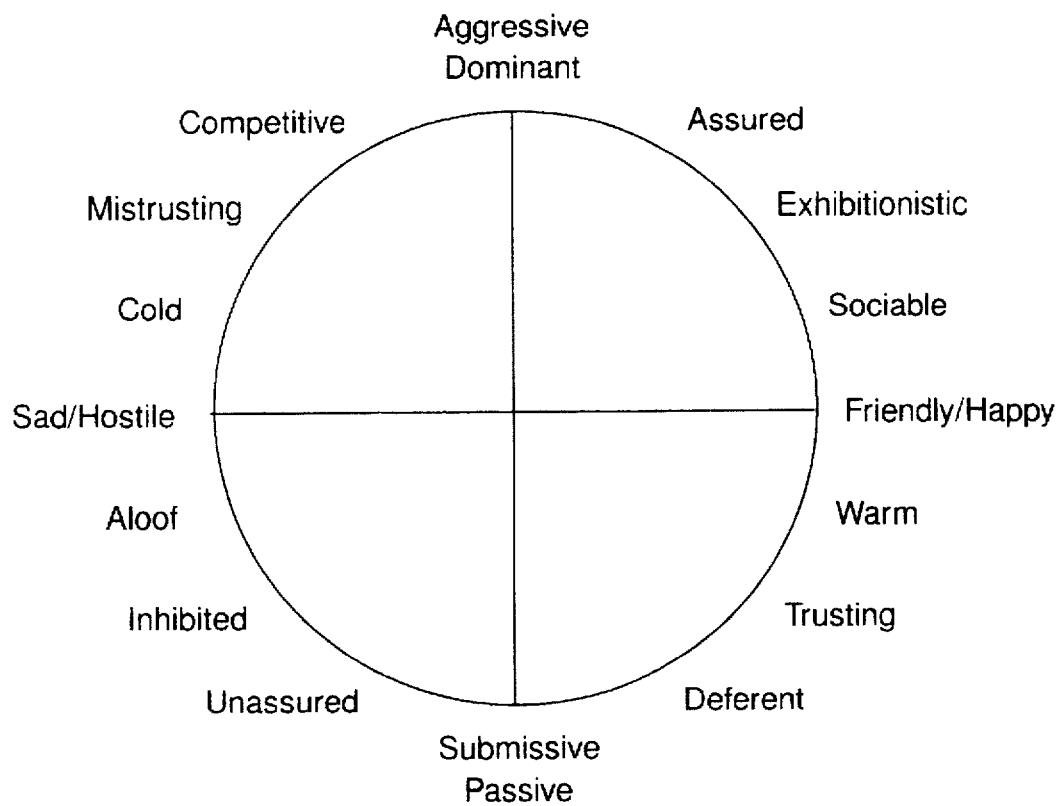
FIG. 1 depicts the 16 elements of the Kiesler model of the circumplex theory of interpersonal relationships.
Figure 2:
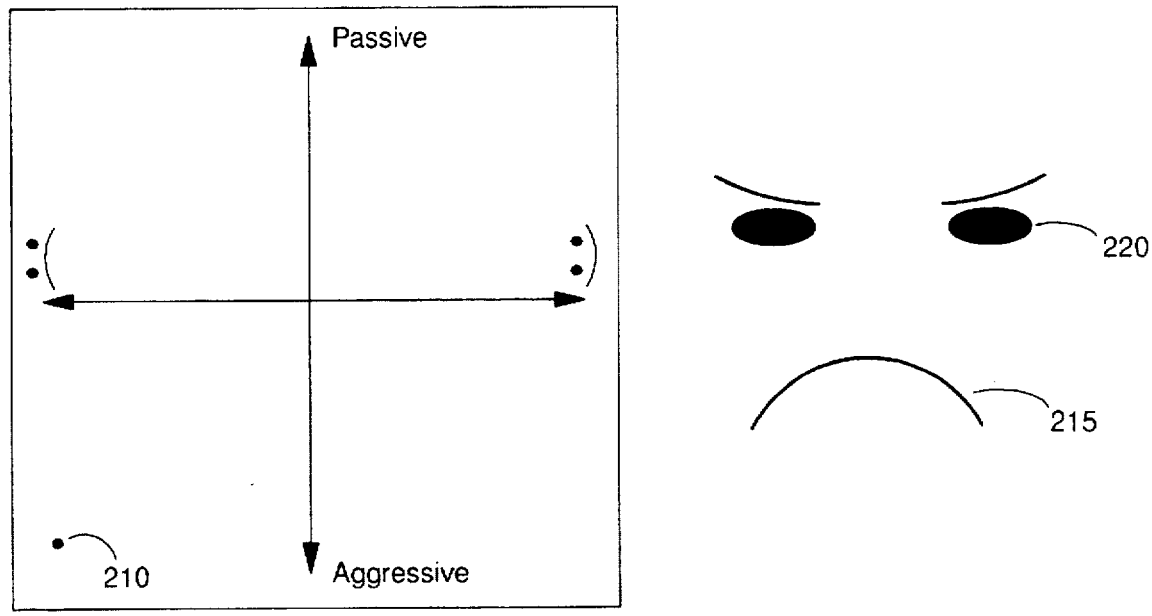
FIG. 2 depicts one example of the user interface of the preferred embodiment.

FIG. 2 depicts the use of the present invention for manipulating a human face to represent emotion. The preferred embodiment has been implemented using a JAVA (JAVA is a registered trademark of Sun Microsystems) applet. The x,y grid depicted to the left of the human face is used to depict the continuum of emotion represented by the circumplex theory. The ranges actually used in the preferred embodiment are negative to positive emotion on the x-axis and aggressiveness to passiveness on the y-axis (as opposed to hostile, friendly and dominant, submissive in the purely theoretical model of FIG. 1).

In the preferred embodiment, the user uses an indicator such as a mouse click or a pen tap to identify where in the spectrum of the interpersonal model the emotion to be represented lies. As the user clicks or taps on the appropriate area, the computer representation of the face changes to reflect the desired emotion. The greater the distance from the origin of the grid, the greater the intensity of the expressed emotion. The point indicated by the pointing device 210 in FIG. 2 is in the lower left corner. This indicates a degree of negative emotion and aggressiveness (expressing the emotion "anger", for example). The resulting user interface reaction is that the facial representation depicts a mouth intensely frowning 215 to indicate the negative emotion and the eye brows close to the eyes 220 to reflect the aggressiveness.

Figure 3:
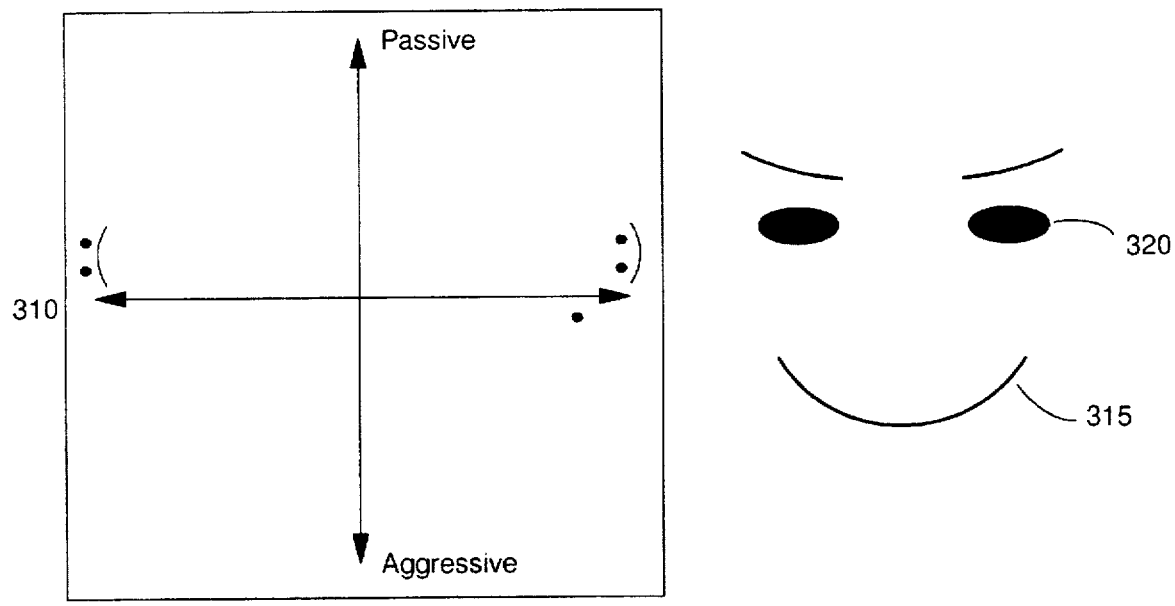
FIG. 3 is another example of the user interface of the preferred embodiment.

FIG. 3 represents the face of the preferred embodiment after the user selects the center left portion of the interpersonal relationship continuum wherein the eye brows have reached an intermediate distance from the eyes 320 indicating that it is not aggressive, yet not passive; it reflects a middle ground in the control continuum. The mouth reflects an intense positive emotion (such as "happiness", for example) 315.

Any point on the emotion control box 210, 310 may be selected to give an infinite gradation of emotions and intensity based on the control and affiliation aspects.

Figure 4:
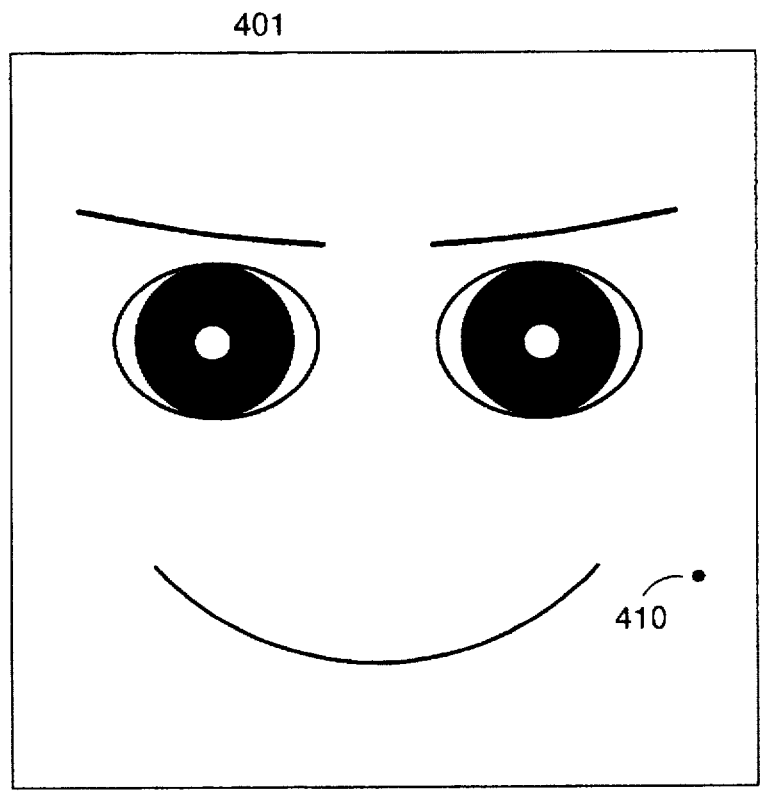
FIG. 4 demonstrates an alternative implementation of the preferred embodiment.

An alternative means of representing the preferred embodiment is shown in FIG. 4. In FIG. 4, the facial representation is superimposed on the emotion control grid. The face in FIG. 4 401 has the emotion control indicator 410 in the lower right quadrant; this indicates a degree of positive emotion and aggressiveness (such as a "devilish grin" for example).

As will be appreciated by one of skill in the art, the present invention is not intended to be limited to a specific theory of emotional determination. Nor is it meant to be limited to a specific facial characteristic (such as a human face, alien face, animal face or inanimate object face). The present invention is also not isolated to a single computer system. It is especially well suited to use on the world wide web or through communications systems. This invention can be implemented in the use of interactive games, interactive commerce and display environments.

That which is claimed is:

1. A method for controlling the display of emotion on a computer generated face comprising at least eyes, eye brows and a mouth; said control comprising the steps of:

identifying x,y coordinates wherein each coordinate corresponds to a distance aspect of emotion:

determining the intensity of the emotion by the distance of the selected point from the intersection of the x,y axis; and, selecting a point on the continuum of said x,y plane to indicate a corresponding emotion of said computer generated face.

2. A method as claimed in claim 1 wherein one of said aspects of emotion represented by said coordinate is coupled to the location of the eyes and the angular inclination of the eye brows and the other of said aspects of emotion represented by said coordinate is coupled to the curvature of the mouth.

3. A method as claimed in claim 1 or 2 wherein said x,y axis is superimposed on said computer generated face.

4. A method as claimed in claim 1 or 2 wherein said x,y axis is not explicitly indicated on the display device.

5. A method as claimed in claim 1 or 2 wherein said emotion display is based on the circumplex theory of interpersonal relationships.

6. A computer program residing on a computer-readable media, said computer program comprising:

computer-readable means for displaying representations of computer generated faces, each of said faces including at least eyes, eye brows and a mouth, on a display device of a computer, said computer having a means for manipulation of a cursor or pointer;

computer-readable means for controlling the display of emotion on said computer generated faces wherein said computer-readable means for controlling comprises:

representing an x,y plane on said display device;

means for selecting a point on the x,y plane to indicate the desired emotion.

7. Computer program as claimed in claim 6 wherein said x,y axis is superimposed on said face.

8. Computer program as claimed in claim 6 wherein said emotion display is based on the circumplex theory of interpersonal relationships.

9. A computer network comprising:

a plurality of workstations connected to an internet;

one or more display devices connected to each of said plurality of workstations;

means for displaying representations of computer generated faces on said display devices;

means for controlling the displayed emotion of said faces on said display devices wherein said means comprises:

representing an x,y axis on said display device wherein the intensity of the emotions are represented by the distance of the point from the intersection of the axis and wherein selection of any point on the continuum of said x,y plain will indicate a corresponding emotion of said computer generated face.

10. A computer network as claimed in claim 9 wherein said x,y axis is superimposed on said computer generated face.

11. A computer network as claimed in claim 9 wherein said emotion displayed is based on the circumplex theory of interpersonal relationships.

* * * * *